United States Patent
Yoshioka et al.

(10) Patent No.: US 6,909,158 B2
(45) Date of Patent: Jun. 21, 2005

(54) CAPACITANCE TYPE DYNAMICAL QUANTITY SENSOR

(75) Inventors: Tetsuo Yoshioka, Okazaki (JP); Yukihiro Takeuchi, Nishikamo-gun (JP); Kazuhiko Kano, Toyoake (JP)

(73) Assignee: Denso Corporation, Kariya (JP)

( * ) Notice: Subject to any disclaimer, the term of this patent is extended or adjusted under 35 U.S.C. 154(b) by 39 days.

(21) Appl. No.: 10/703,460

(22) Filed: Nov. 10, 2003

(65) Prior Publication Data

US 2004/0094814 A1 May 20, 2004

(30) Foreign Application Priority Data

Nov. 18, 2002 (JP) .......................................... 2002-334070

(51) Int. Cl.$^7$ .............................................. H01L 27/00
(52) U.S. Cl. ........................ 257/414; 257/414; 257/415
(58) Field of Search ................................ 257/414, 415, 257/417, 218, 419, 420; 438/52; 73/514.16

(56) References Cited

U.S. PATENT DOCUMENTS 5,126,812 A * 6/1992 Greiff .......................... 257/417
6,151,966 A 11/2000 Sakai et al.

* cited by examiner

Primary Examiner—David Nelms
Assistant Examiner—Thinh T Nguyen
(74) Attorney, Agent, or Firm—Posz Law Group, PLC

(57) ABSTRACT

A capacitance type dynamical quantity sensor includes a semiconductor substrate, a weight portion being displaced in accordance with a dynamical quantity, a movable electrode integrated with the weight portion, and a fixed electrode facing the movable electrode. The movable electrode and the fixed electrode provide a capacitor having a capacitance. The movable electrode is movable in accordance with the dynamical quantity. The capacitance of capacitor is changed in accordance with a displacement of the movable electrode so that the dynamical quantity as the capacitance change is measured with an outer circuit. The facing surface of the movable electrode facing the fixed electrode has a substantially rectangular shape, and an aspect ratio of the facing surface is in a range between 0.1 and 10.

11 Claims, 5 Drawing Sheets

CAPACITANCE TYPE DYNAMICAL QUANTITY SENSOR

CROSS REFERENCE TO RELATED APPLICATION

This application is based on Japanese Patent Application No. 2002-334070 filed on Nov. 18, 2002, the disclosure of which is incorporated herein by reference.

FIELD OF THE INVENTION

The present invention relates to a capacitance type dynamical quantity sensor having a pair of movable and fixed electrodes for providing a capacitor.

BACKGROUND OF THE INVENTION

A capacitance type dynamical quantity sensor according to a prior art is disclosed in U.S. Pat. No. 6,151,966. FIG. 7 shows the dynamical quantity sensor 111 according to the prior art. The sensor 111 is an acceleration sensor, and has a movable electrode 16 and a pair of fixed electrodes 17, 18. The movable and fixed electrodes 16–18 face each other so that they form a capacitor. When acceleration is applied to the sensor in a direction Z, a movable portion 12 having the movable electrode 16 moves to some extent. Then, capacitance of the capacitor between the movable and fixed electrodes 16–18 is changed. This capacitance change is measured with an outer electric circuit so that the acceleration is detected.

FIG. 8 shows a schematic graph of a relationship between the capacitance change $\Delta C$ and vibration frequency $\omega$ of the movable portion 12. Here, the capacitance change $\Delta C$ represents a sensitivity of the sensor 111, and has the maximum value at resonant frequency $\omega n$ (n=1, 2, 3, ...). In other words, the capacitance change $\Delta C$ is peaked at the resonant frequency $\omega n$.

When the acceleration is measured with the capacitance type dynamical quantity sensor 111, it is preferred that frequency dependence of the sensor sensitivity is small. That is because the measured value of the capacitance change is easily compensated by the outer electric circuit in case of small frequency dependence. Accordingly, when the resonant frequency $\omega 1$ of the movable portion 12 is disposed in a measurement frequency range Y, a spring constant K of the movable portion 12 is set to be larger, or mass M of the movable portion 12 is set to be smaller. Thus, the resonant frequency $\omega n$ of the movable portion 12 is changed from $\omega 1$ to $\omega 2$. Therefore, the resonant frequency $\omega n$, i.e., $\omega 2$ becomes larger than the measurement frequency range Y. Thus, in the measurement frequency range Y, the frequency dependence of sensor sensitivity becomes small so that the measured value is easily compensated. However, the sensitivity itself becomes lower in the measurement frequency range Y, as shown by the solid line in FIG. 8.

SUMMARY OF THE INVENTION

In view of the above problem, it is an object of the present invention to provide a capacitance type dynamical quantity sensor having a large sensitivity and low frequency dependence of sensor sensitivity in a measurement frequency range.

A capacitance type dynamical quantity sensor includes a semiconductor substrate, a weight portion, a movable electrode, and a fixed electrode. The weight portion is displaced in accordance with a dynamical quantity applied to the weight portion, and supported with the substrate. The movable electrode is integrated with the weight portion. The fixed electrode faces the movable electrode and is cantilevered with the substrate. The movable electrode and the fixed electrode provide a capacitor having a capacitance. The movable electrode is movable in accordance with the dynamical quantity in a perpendicularly direction perpendicular to a facing surface of the movable electrode. The facing surface faces the fixed electrode. The capacitance of the capacitor is changed in accordance with a displacement of the movable electrode so that a capacitance change is detected with an outer circuit. The facing surface of the movable electrode has a substantially rectangular shape, and an aspect ratio of the facing surface is in a range between 0.1 and 10.

In the above sensor, a damping coefficient of the movable portion has the maximum value in a range of the aspect ratio L/H between 0.1 and 10. Even when the area of the facing surface is changed or the distance between the fixed and movable electrodes is changed, the damping coefficient has the maximum value in the range of the aspect ratio L/H between 0.1 and 10. In this sensor, the area of the facing surface is constant, so that the initial capacitance of the capacitor does not change in a case where the movable portion is stopped. Moreover, the damping coefficient becomes the maximum value, so that the sensor having a small frequency dependence of the sensor sensitivity is prepared. Further, the sensor has a large sensitivity.

Further, a capacitance type dynamical quantity sensor includes a silicon on insulator substrate, a movable portion movable in accordance with a dynamical quantity applied thereto and supported with the substrate, and a fixed electrode cantilevered with the substrate. The movable portion includes a weight portion, a spring portion and a movable electrode. The spring portion is supported with the substrate, and connects to the weight portion so that the weight portion is separated from the substrate. The movable electrode connects to the weight portion, and faces the fixed electrode. The movable electrode and the fixed electrode provide a capacitor having a capacitance. The movable electrode is movable in accordance with the movable portion in a perpendicularly direction perpendicular to a facing surface of the movable electrode. The facing surface faces the fixed electrode. The capacitance of the capacitor is changed in accordance with a displacement of the movable electrode so that a capacitance change is measured with an outer circuit. The facing surface of the movable electrode has a substantially rectangular shape, and an aspect ratio of the facing surface is in a range between 0.1 and 10.

The above sensor has a small frequency dependence of the sensor sensitivity and a large sensitivity.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1A:
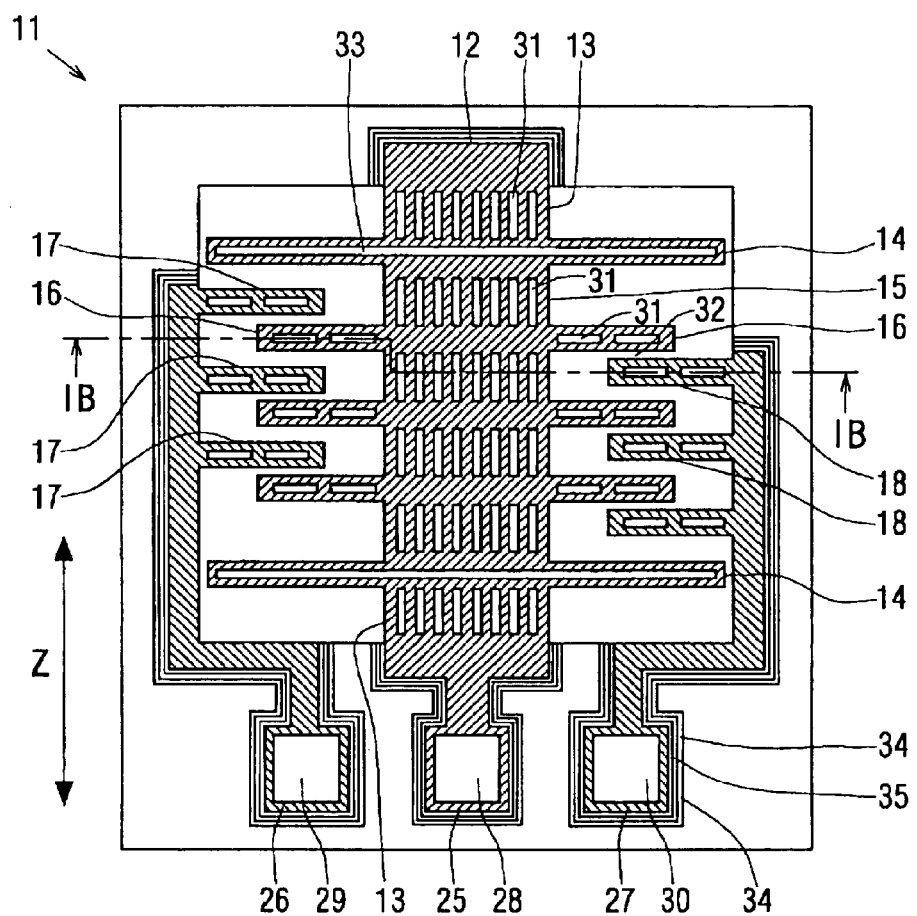
FIG. 1A is a plan view showing a capacitance type dynamical quantity sensor according to a preferred embodiment of the present invention.
Figure 1B:
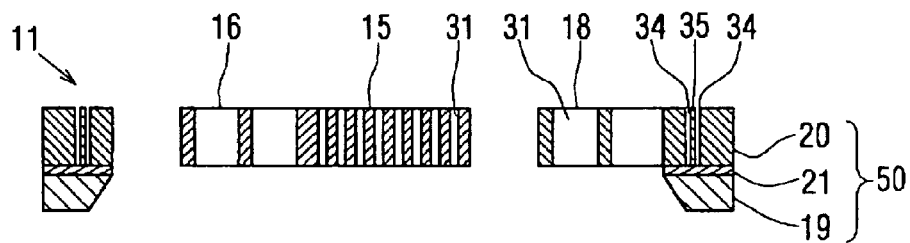
FIG. 1B is a cross-sectional view showing the sensor taken along line IB—IB in FIG. 1A.

A capacitance type dynamical quantity sensor according to a preferred embodiment of the present invention is shown in FIGS. 1A and 1B. The sensor 11 is formed on a silicon on insulator substrate (i.e., SOI substrate) 50 with using semiconductor processing techniques such as a micro-machining method. As shown in FIG. 1A, the sensor 11 includes a movable portion 12 and the first and second fixed electrodes 17, 18. The movable portion 12 has an anchor 13, a spring portion 14, a weight portion 15, and a movable electrode 16. The spring portion 14 having a rectangular beam is supported with the anchor 13. The weight portion 15 connects to the spring portion 14. The movable electrode 16 is disposed on both sides of the weight portion 15, and has a plurality of comb teeth. On the other hand, the first fixed electrode 17 having a plurality of comb teeth faces the movable electrode 16 on one side. The second fixed electrode 18 faces the movable electrode 16 on the other side.

In the movable portion 12 and the first and second fixed electrodes 17, 18, a plurality of through holes 31 is formed for reducing weight, and has a rectangular shape. A protrusion 32 is formed on one surface of the first fixed electrode 17, which faces the movable electrode 16. The protrusion 32 prevents the first fixed electrode 17 from adhering to the movable electrode 16 by electrostatic force. Moreover, another protrusion 33 is formed on the inner surface of the spring portion 14 in the movable portion 12. The protrusion 33 prevents the rectangular beam from adhering together by electrostatic force.

Electrode pads 28–30 are formed on the pad regions 25–27 on the SOI substrate, respectively. Each electrode pad 28–30 retrieves an electric signal from the movable electrode and first and second fixed electrodes 16–18, respectively. The pad region 25–27 is required to separate electrically from surroundings, i.e., the second semiconductor layer 20 so that the electric signal is retrieved. Therefore, the pad region 25–27 is separated structurally and electrically with a double groove 34. In the double groove 34, a bank portion 35 is formed, so that the double groove 34 with the bank portion 35 prevents the pad region 24–27 from shorting to the surroundings by conductive contaminations.

As shown in FIG. 1B, the sensor 11 is composed of the SOI substrate 50 including the first and second semiconductor layers 19, 20 and an insulation layer 21 therebetween. The insulation layer 21 works as a support layer of the second semiconductor layer 20. Part of the first semiconductor layer 19 and the insulation layer 21 is removed so as to expose part of the second semiconductor layer 20 that the movable portion 12 and the first and second fixed electrodes 17, 18 are disposed. Thus, in the sensor 11, both ends of the movable portion 12 are supported on the insulation layer 21. Moreover, each of the first and second fixed electrodes 17, 18 is cantilevered with the insulation layer 21.

When acceleration is applied to the sensor 11 in an acceleration direction Z, the movable portion 12 having the movable electrode 16 moves to some extent. Then, capacitance of a capacitor between the movable and fixed electrodes 16–18 is changed. This capacitance change is measured with an outer electrical circuit so that the acceleration is detected.

Figure 2:
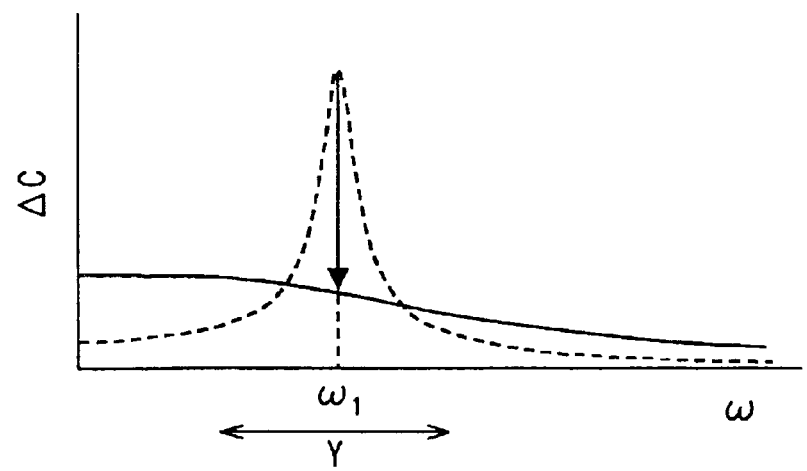
FIG. 2 is a graph showing a relationship between vibration frequency $\omega$ and capacitance change $\Delta C$ in the sensor according to the preferred embodiment.

Principle of operation of the capacitance type dynamical quantity sensor 11 is explained with referring to FIG. 2. FIG. 2 shows a relationship between frequency ω and capacitance change ΔC in the sensor 11, when the movable portion 12 of the sensor 11 vibrates with frequency ω.

Sensor sensitivity of the sensor 11 is represented by a ratio of capacitance change ΔC/C0. Here, the capacitance change ΔC represents a change of capacitance C in accordance with a displacement of the movable portion 12. An initial capacitance C0 is the initial capacitance when the movable portion 12 remains stationary without applying the acceleration. Namely, the sensor sensitivity is expressed as the capacitance change ΔC according to the displacement of the movable electrode 16.

Figure 7:
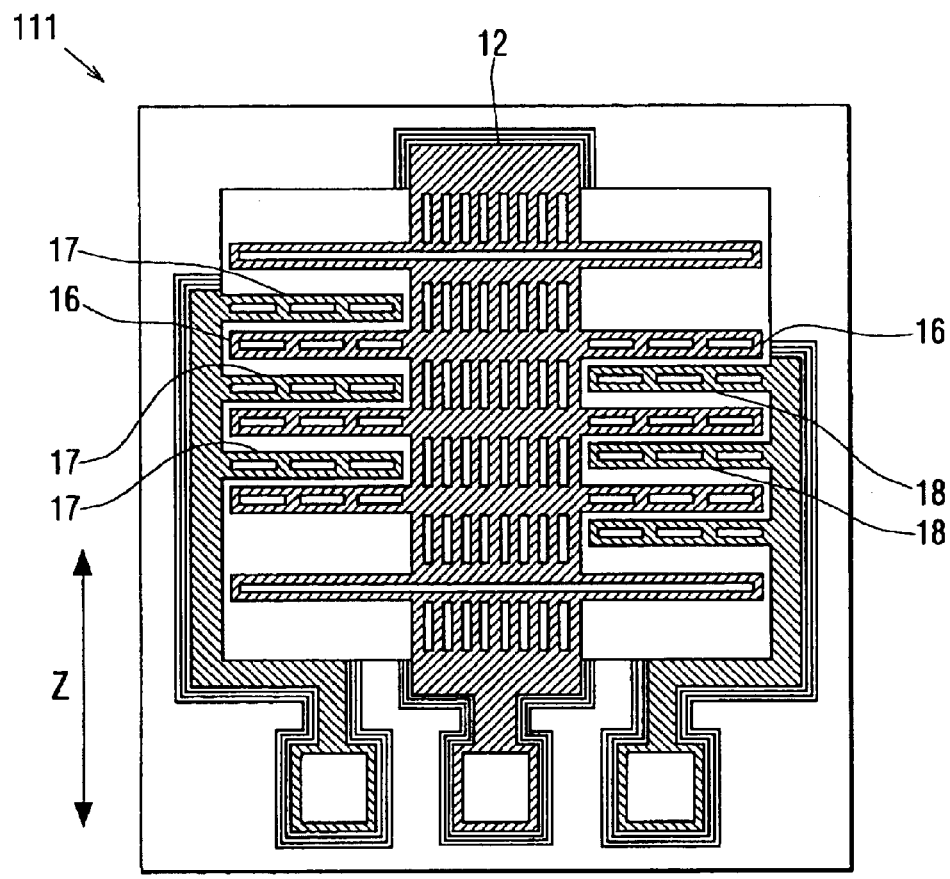
FIG. 7 is a plan view showing a capacitance type dynamical quantity sensor according to a prior art.
Figure 8:
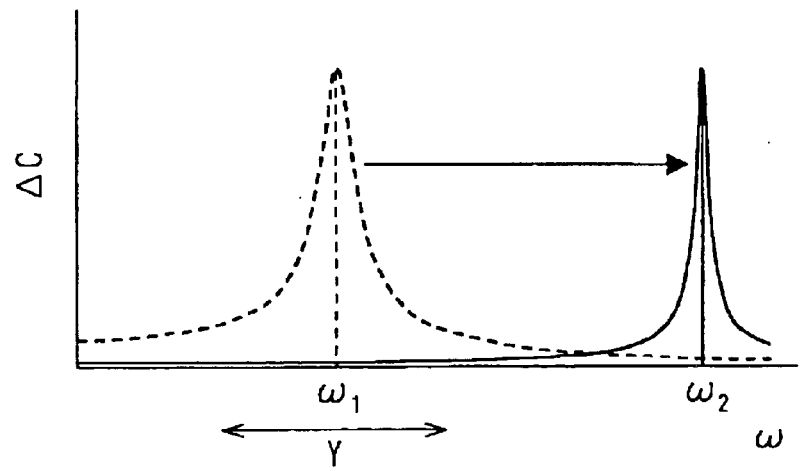
FIG. 8 is a graph showing a relationship between vibration frequency ω and capacitance change ΔC in the sensor according to the prior art.

As shown in FIG. 7, in the sensor 111 according to the prior art, when the resonant frequency ω1 is disposed in the measurement frequency range Y, the resonant frequency ωn is changed from ω1 to ω2 so that the frequency dependence of the sensor sensitivity is reduced.

In this embodiment, the resonant frequency ω1 is not displaced, but the resonant frequency ωn is set in the measurement frequency range Y or set near the measurement frequency range Y so that the frequency dependence of the sensor sensitivity is reduced with using damping of the movable portion 12.

The damping of the movable portion 12 is explained as follows. In the sensor 11, squeeze film damping is generated by viscosity of air disposed between the movable electrode 16 and the fixed electrode 17, 18. By utilizing this squeeze film damping effect between the movable electrode 16 and the fixed electrode 17, 18, amplification of the displacement of the movable electrode 12 caused by resonance is suppressed. Therefore, the frequency dependence of the sensor sensitivity is reduced even when the resonant frequency n is disposed in the measurement frequency range Y.

Next, this squeeze film damping effect is explained with using mathematical formulas. The sensor 11 with utilizing the squeeze film damping effect follows the following mathematical formulas.

$$\Delta C = \varepsilon L H \left( \frac{1}{D-X} - \frac{1}{D+X} \right) \tag{F1}$$

$$M\ddot{X} + E\dot{X} + KX = F\cos(\omega T) \tag{F2}$$

$$X = \frac{\delta_{st}}{\sqrt{\left(1 - \left(\frac{\omega}{\omega n}\right)^2\right)^2 + \left(\frac{1}{Q}\frac{\omega}{\omega n}\right)^2}} \cos(\omega T - \beta) \tag{F3}$$

$$\omega n = \sqrt{\frac{K}{M}} \tag{F4}$$

-continued $$Q = \frac{\sqrt{MK}}{E} = \frac{M}{E}\omega n \quad (F5)$$

$$\delta st = \frac{M}{K}\alpha \quad (F6)$$

Here, ΔC represents the capacitance change, ε a dielectric constant, L a length of a facing surface of a pair of the movable electrode 16 and the fixed electrode 17, 18, H a height of the facing surface of a pair of the movable electrode 16 and the fixed electrode 17, 18, D a distance between the movable electrode 16 and the fixed electrode 17, 18, X a displacement of the movable electrode 16 measured from a center between the movable electrode 16 and the fixed electrode 17, 18, M the mass of the movable portion 12, E a damping coefficient of the movable portion 12, K a spring constant, F vibration force of amplitude, ω a frequency of vibration, β a delay angle, ωn a resonant frequency of vibration, Q a magnification of resonant (i.e., a Q-value), δst a static amplitude, and α an acceleration.

Formula F1 shows a relationship between the capacitance change ΔC as the sensor sensitivity of the sensor 11 and the displacement X of the movable electrode 16 measured from the center between the movable electrode 16 and the fixed electrode 17, 18. Formula F2 shows a dynamic equation of the movable portion 12. The solution of the dynamic equation F2 is shown as Formula F3. Formula F4 defines the resonant frequency ωn. Formula F5 defines the magnification of resonant Q.

When the frequency ω of vibration becomes the resonant frequency ωn, Formula F3 is replaced to Formula F7.

$$X = Q\delta st \cdot \cos(\omega T - \beta) \quad (F7)$$

Here, the Q-value Q represents a magnification of amplitude δ to the static amplitude δst, when the frequency ω of vibration coincides with the resonant frequency ωn. Formula F6 shows a relationship between the static amplitude δst and the acceleration α, which is the measurement value detected by the sensor 11. In the sensor 11, the capacitance change ΔC is measured so that the sensor 11 calculates the static amplitude δst with using Formula F1 and Formula F3. Then, with using Formula F6, the acceleration α is obtained.

Figure 3:
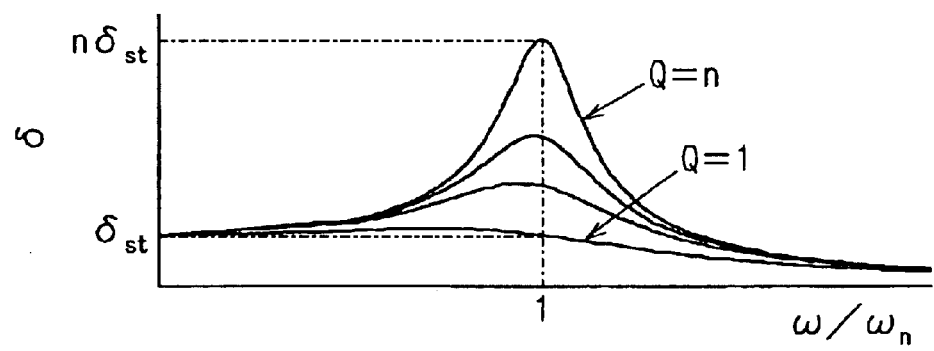
FIG. 3 is a graph showing a relationship between amplitude $\delta$ and frequency ratio $\omega/\omega n$ in the sensor according to the preferred embodiment.

FIG. 3 is a graph showing the relationship between the amplitude δ and the frequency ratio ω/ωn obtained by Formula F3. Here, the amplitude δ is obtained by Formula F8.

$$\delta = \frac{\delta st}{\sqrt{\left(1 - \left(\frac{\omega}{\omega n}\right)^2\right)^2 + \left(\frac{1}{Q}\frac{\omega}{\omega n}\right)^2}} \quad (F8)$$

FIG. 3 also shows the relationship between the amplitude δ and the frequency ratio ω/ωn in case of various magnifications of resonant Q at the resonant frequency ωn obtained by Formula F5.

As shown in FIG. 3, the Q-value Q becomes smaller, the frequency dependence of the amplitude δ becomes small. Therefore, both frequency dependences of the displacement X and the capacitance change ΔC become small, respectively. The magnification of resonant Q relates to the damping coefficient E as shown in Formula F5. If the damping coefficient E according to the squeeze film damping effect becomes large, the magnification of resonant Q becomes small, so that the frequency dependence of the sensor sensitivity, i.e., capacitance change ΔC becomes small.

Accordingly, the sensor 11 having the small frequency dependence of the sensor sensitivity by the damping effect has a comparatively high sensitivity in the measurement frequency range Y, compared with the conventional sensor 111. Here, in the conventional sensor 111, the resonant frequency ωn changes to the outside of the measurement frequency range Y, so that the sensor sensitivity is reduced. However, in the sensor 11 according to this embodiment, for example, if the spring constant K is decreased and/or the mass M is increased, the resonant frequency ωn becomes small according to Formula F4. Thus, the resonant frequency ωn is disposed in the measurement frequency range Y or near the measurement frequency range Y. On the other hand, if the spring constant K is decreased and/or the mass M is increased, the sensor sensitivity becomes large according to Formula F6.

Figure 4A:
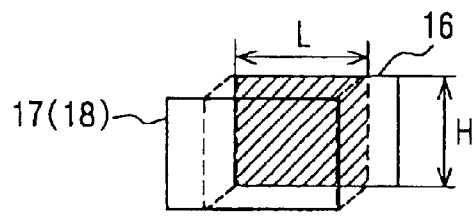
FIG. 4A is a schematic perspective view showing a facing surface of a pair of fixed and movable electrodes.
Figure 4B:
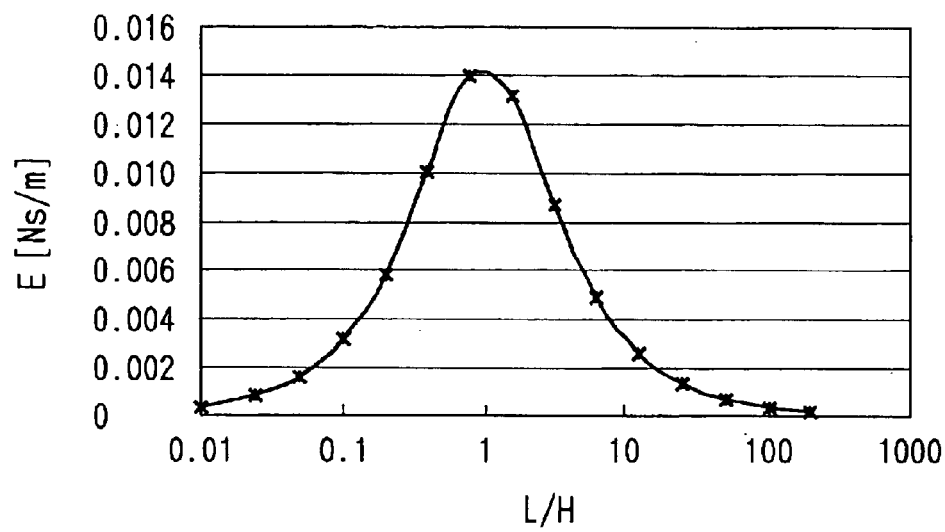
FIG. 4B is a graph showing a relationship between damping coefficient E and aspect ratio of a facing surface L/H.

In the sensor 11, a facing surface of the movable electrode 16 that faces the fixed electrode 17, 18 has a substantially rectangular shape, and the aspect ratio L/H of the facing surface having the length L and height H of the rectangular is in a range between 0.1 and 10. FIGS. 4 and 4B shows a relationship between the damping coefficient E and the aspect ratio L/H, when the aspect ratio L/H is changed without changing the area of the rectangular, i.e., without changing the product of L×H. FIG. 4B is a calculation result in a case where the area of the facing surface is set to 0.25 mm² and the distance D between the movable and fixed electrodes 16–18 is set to 4 μm.

As shown in FIG. 4B, the damping coefficient E has the maximum value in a range of the aspect ratio L/H between 0.1 and 10. Specifically, when the aspect ratio L/H is 1.0, i.e., when the facing surface becomes a square, the damping coefficient E becomes the maximum value. Here, even when the area of the facing surface is changed or the distance D between the electrodes 16–18 is changed, the damping coefficient E has the maximum value in a range of the aspect ratio L/H between 0.1 and 10. In the sensor 11, the area of the facing surface is constant, so that the initial capacitance C0 does not change in a case where the movable portion is stopped. Moreover, the damping coefficient E becomes the maximum value, so that the sensor 11 having a small frequency dependence of the sensor sensitivity is prepared. Further, the sensor 11 has a large sensitivity.

Figure 5:
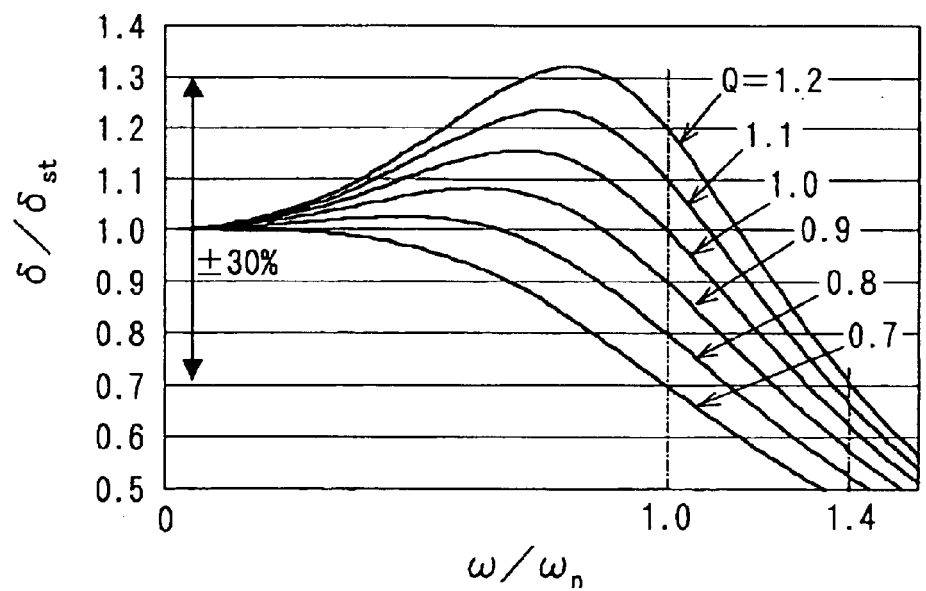
FIG. 5 is a graph showing a relationship between frequency ratio ω/ωn and amplitude ratio δ/δst in the sensor according to the preferred embodiment.

FIG. 5 shows a relationship between the frequency ratio ω/ωn and the amplitude ratio δ/δst in the sensor 11 with utilizing the damping effect. The relationship is expressed with Formula F8. Here, if the sensor sensitivity, i.e., the amplitude δ of vibration of the movable portion 12 depends on the frequency ω, the frequency dependence of the amplitude δ is required within 30% in the measurement frequency range Y, so that an electric circuit can compensate the frequency dependence of the amplitude δ easily.

As shown in FIG. 5, when the Q-value Q is equal to or less than 1.2, the frequency dependence of the amplitude δ is within 30% in the measurement frequency range Y. Here, the Q-value Q is a magnification of the amplitude δ to the static amplitude δst. Therefore, in the sensor 11 having the Q-value Q, which is equal to or below 1.2, the electric circuit can compensate the frequency dependence of the amplitude δ easily. Thus, the sensor 11 having small frequency dependence is provided with an inexpensive manufacturing cost.

In the sensor 11 with the aspect ratio L/H being in a range between 0.1 and 10, the area of the facing surface is increased and the damping coefficient E is increased, so that the Q-value Q becomes lower than 1.2. If the area of the facing surface becomes large, the initial capacitance C0 is also increased. However, the capacitance change ΔC is increased. Accordingly, the sensor sensitivity of the sensor 11 is not decreased, although the area of the facing surface is increased and the sensor 11 is a capacitance type dynamical quantity sensor for measuring the ratio of the capacitance change $\Delta C/C0$.

Moreover, in the sensor 11, the aspect ratio L/H is in the range between 0.1 and 10, and the sensor utilizes the maximum of the damping coefficient E. It is preferred that the area of the facing surface is provided by a plurality of movable electrodes 16, rather than provided by a single movable electrode 16, when the area of the facing surface is secured to have a predetermined area. As shown in FIG. 4A, the movable electrode 16 has a rectangular surface facing the fixed electrode 17, 18, so that the damping of the movable electrode 16 becomes large. Therefore, the movable electrode 16 is preferable to divide into a plurality of electrodes so that the movable electrode is disposed on the side of the weight portion 15 so as to balance properly. Thus, the vibration of the movable portion 12 composed of the weight portion 15 and the movable electrode 16 can be balanced properly. Accordingly, a plurality of electrodes composing the movable electrode 16 having the area of the facing surface, the aspect ratio L/H of which is in a range between 0.1 and 10, is disposed on the side of the weight portion 15, so that the movable portion is properly balanced. Therefore, the endurance of the sensor 11 is improved.

Figure 6A:
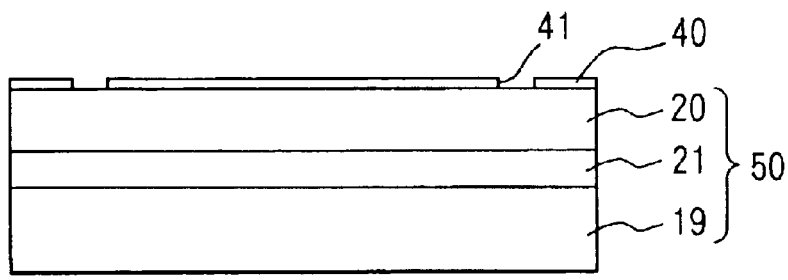
FIGS. 6A to 6D are cross-sectional views of the sensor explaining a manufacturing method of the sensor according to the preferred embodiment.
Figure 6B:
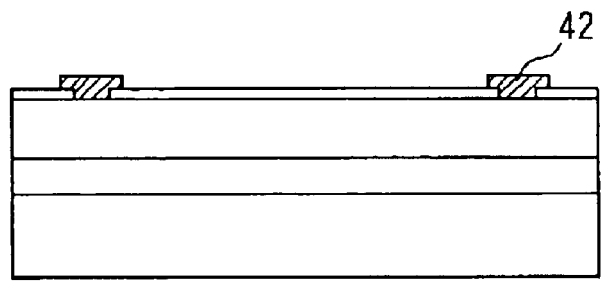

The sensor 11 according to this embodiment is formed as follows. FIGS. 6A to 6D explain a manufacturing process for forming the sensor 11. As shown in FIG. 6A, the SOI substrate 50 includes the first semiconductor layer 19, the insulation layer 21 made of oxide film, and the second semiconductor layer 20. The first and second semiconductor layers 19, 20 are made of silicon. At first, the first oxide film 40 is formed on the SOI substrate 50. Then, a contact hole 41 is formed in the first oxide film 40. In the contact hole 41, an aluminum electrode 42 is formed. The aluminum electrode 42 corresponds to the electrode pads 28–30 shown in FIG. 1A.

Figure 6C:
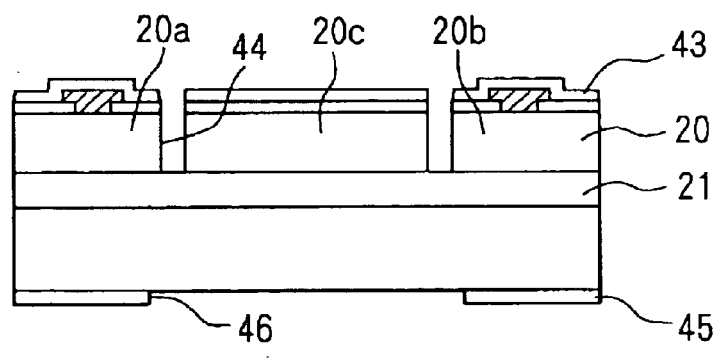
Figure 6D:
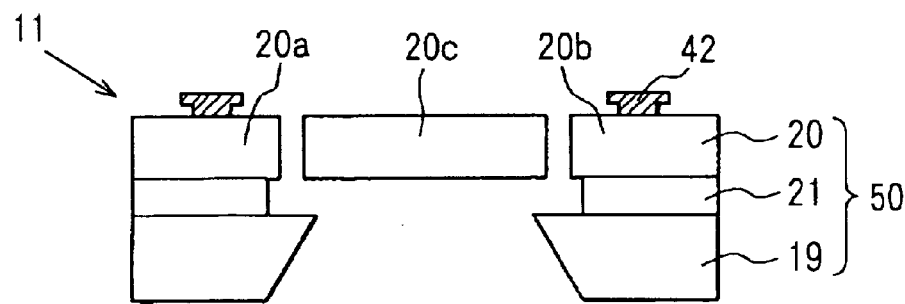

As shown in FIG. 6C, the second oxide film 43 is formed on the substrate 50. After that, a groove 44 is formed with using the second oxide film 43 as a mask. The groove 44 reaches the insulation layer 21 disposed inside the substrate 50. Thus, the second semiconductor layer 20 is divided into three parts 20a, 20b, 20c. Two of the three parts 20a, 20b correspond to the first and second fixed electrodes 17, 18. The last one part 20c corresponds to the movable electrode 16 and the weight portion 15.

Next, the third oxide film 45 is formed on the bottom side of the substrate 50. The third oxide film 45 is used as a mask for etching the bottom side of the substrate 50. An opening 46 is formed in the third oxide film 45. Then, the substrate 50 is etched from the bottom side of the substrate 50 with using the third oxide film 45 having the opening 46 as a mask such that the etching reaches the insulation layer 21 disposed inside the substrate 50.

Finally, the first to third oxide films 40, 43, 45 are eliminated in an oxide film removal process. Simultaneously, part of the insulation layer 21, which is disposed under the part 20c, is also eliminated, so that the three parts 20a–20c are separated each other. Thus, the sensor 11 is accomplished.

Although the sensor 11 is formed with using the SOI substrate 50, the sensor 11 can be formed with using a normal silicon substrate without any insulation layer disposed inside the substrate. However, in this case, the etching from the bottom side of the substrate has less accuracy of etching. Therefore, thickness of the part 20c, i.e., the height of the facing surface is dispersed in a range between −30% and +30%. As shown in FIG. 4B, the damping coefficient E becomes the maximum value in a case where the aspect ratio L/H is 1.0, i.e., the facing surface of the movable electrode 16 becomes square. Accordingly, it is preferred that the facing surface is square. However, in the sensor 11 formed of the normal silicon without any insulation layer therein, the manufacturing error of etching is ±30%, so that the aspect ratio L/H of the facing surface is in a range between 0.7 and 1.3. Therefore, the damping coefficient E is approximated to the maximum value in the above error range, so that the sensor 11 has a comparatively high sensitivity and a small frequency dependence of the sensor sensitivity.

On the other hand, in case of the sensor 11 formed with using the SOI substrate 50, the insulation layer 21 disposed inside the substrate 50 works as a stopper for stopping the etching of the first semiconductor layer 19 from the bottom side of the substrate 50. Therefore, the insulation layer 21 also works as a reference in the oxide film elimination process, which is a post-process of the etching of the first semiconductor layer 19. Thus, the height of the part 20c, i.e., the height of the facing surface has a small dispersion, which is in a range between −10% and +10%.

Therefore, in the sensor 11 formed with using the SOI substrate 50, the manufacturing error can be suppressed within ±10%. Thus, the aspect ratio L/H of the facing surface is in a range between 0.9 and 1.1, so that the facing plate is approximated to the square much more than the sensor 11 formed with using the normal silicon substrate. Therefore, the damping coefficient E is approximated to the maximum value, so that the sensor 11 has the high sensor sensitivity and a small frequency dependence of the sensor sensitivity.

Such changes and modifications are to be understood as being within the scope of the present invention as defined by the appended claims.

What is claimed is:

1. A capacitance type dynamical quantity sensor comprising:

a semiconductor substrate;

a weight portion being displaced in accordance with a dynamical quantity applied to the weight portion, and supported with the substrate;

a movable electrode integrated with the weight portion; and a fixed electrode facing the movable electrode and cantilevered with the substrate, wherein the movable electrode and the fixed electrode provide a capacitor having a capacitance, wherein the movable electrode is movable together with the weight portion in accordance with the dynamical quantity in a perpendicularly direction perpendicular to a facing surface of the movable electrode, the facing surface facing the fixed electrode, wherein the capacitance of the capacitor is changed in accordance with a displacement of the movable electrode so that a capacitance change is detected by an outer circuit, and wherein the facing surface of the movable electrode has a substantially rectangular shape, and an aspect ratio of the facing surface is in a range between 0.1 and 10.

2. The sensor according to claim 1, wherein the substrate is a silicon substrate, and wherein the aspect ratio is in a range between 0.7 and 1.3.

3. The sensor according to claim 2,
wherein the substrate is a silicon on insulator substrate, and
wherein the aspect ratio is in a range between 0.9 and 1.1.

4. The sensor according to claim 1,
wherein the facing surface includes a plurality of surfaces.

5. The sensor according to claim 1,
wherein the weight portion and the movable electrode provide a movable portion having a mass of M, a spring constant of K, and a damping coefficient of E,
wherein the movable portion further includes a Q-value of Q, which is represented by a formula of $$Q = \frac{\sqrt{MK}}{E},$$

wherein the Q-value is equal to and lower than 1.2.

6. A capacitance type dynamical quantity sensor comprising:
a silicon on insulator substrate;
a movable portion movable in accordance with a dynamical quantity applied thereto and supported with the substrate; and
a fixed electrode cantilevered with the substrate,
wherein the movable portion includes a weight portion, a spring portion and a movable electrode,
wherein the spring portion is supported with the substrate, and connects to the weight portion so that the weight portion is separated from the substrate,
wherein the movable electrode connects to the weight portion, and faces the fixed electrode,
wherein the movable electrode and the fixed electrode provide a capacitor having a capacitance,
wherein the movable electrode is movable together with the movable portion in a perpendicularly direction perpendicular to a facing surface of the movable electrode, the facing surface facing the fixed electrode,
wherein the capacitance of the capacitor is changed in accordance with a displacement of the movable electrode so that a capacitance change is measured with an outer circuit, and
wherein the facing surface of the movable electrode has a substantially rectangular shape, and an aspect ratio of the facing surface is in a range between 0.1 and 10.

7. The sensor according to claim 6,
wherein the fixed electrode includes a plurality of teeth, and disposed on both sides of the movable portion, and
wherein the movable electrode includes a plurality of teeth, each of which faces a corresponding tooth of the fixed electrode, and disposed on both sides of the weight portion.

8. The sensor according to claim 7,
wherein the fixed electrode and the movable portion further includes a plurality of through holes for reducing mass thereof.

9. The sensor according to claim 8,
wherein the aspect ratio is in a range between 0.9 and 1.1 so that a squeeze film damping effect functions between the movable and fixed electrodes.

10. The sensor according to claim 9,
wherein the movable portion moves in a dynamical direction that the dynamical quantity is applied so that the dynamical quantity in the dynamical direction is detected, and
wherein the teeth of the movable electrode are disposed perpendicularly to the dynamical direction.

11. The sensor according to claim 10,
wherein the movable portion has a mass of M, a spring constant of K, and a damping coefficient of E,
wherein the movable portion further includes a Q-value of Q, which is represented by a formula of $$Q = \frac{\sqrt{MK}}{E},$$

and
wherein the Q-value is equal to and lower than 1.2.

* * * * *